United States Patent [19]

Cohen et al.

[11] Patent Number: 4,775,236
[45] Date of Patent: * Oct. 4, 1988

[54] LASER BASED ROUNDNESS AND DIAMETER GAGING SYSTEM AND METHOD OF USING SAME

[75] Inventors: David A. Cohen, Cambridge; David M. Papurt, Chestnut Hill, both of Mass.

[73] Assignee: Laser Metric Systems, Inc., Cambridge, Mass.

[*] Notice: The portion of the term of this patent subsequent to Jul. 7, 2004 has been disclaimed.

[21] Appl. No.: 69,874

[22] Filed: Jul. 6, 1987

Related U.S. Application Data

[63] Continuation-in-part of Ser. No. 730,200, May 3, 1985, Pat. No. 4,678,337.

[51] Int. Cl.$^4$ .............................................. G01B 11/02
[52] U.S. Cl. ...................................... 356/387; 356/386
[58] Field of Search .............................. 356/384–387, 356/356

[56] References Cited

U.S. PATENT DOCUMENTS

| | | | |
|---|---|---|---|
| 3,980,141 | 11/1969 | Rock, Jr. | 356/385 |
| 4,007,992 | 2/1977 | Petrohilo et al. | 356/387 |
| 4,063,103 | 12/1977 | Sumi | 372/3 |
| 4,097,158 | 6/1978 | Dehait | 356/387 |

Primary Examiner—R. A. Rosenberger
Assistant Examiner—Crystal Cooper
Attorney, Agent, or Firm—Burns, Doane, Swecker & Mathis

[57] ABSTRACT

A device for measuring an object includes a laser beam, a translator for moving the object with respect to the beam, an object reference plane which is the plane perpendicular to the beam that is first entered by the object, a lens system for imaging a light pattern formed in a second plane onto a first plane, wherein the second plane is adjacent to the object reference plane, and the light pattern includes a diffraction pattern caused by interaction of the beam and the object, a slit interposed at the first plane for limiting the extent of the beam that passes through the first plane, and a photodetector that emits a signal representative of the light received behind the slit for detecting the portion of the beam that passes through this slit. The slit is sufficiently small so as to enable resolution of the diffraction pattern by the photodetector. The device further includes a circuit for calculating a dimension of the object in response to the signal emitted by the photodetector. A method of gauging roundness includes using this device for moving the object in a direction perpendicular to the beam and rotating the object within the beam.

13 Claims, 6 Drawing Sheets

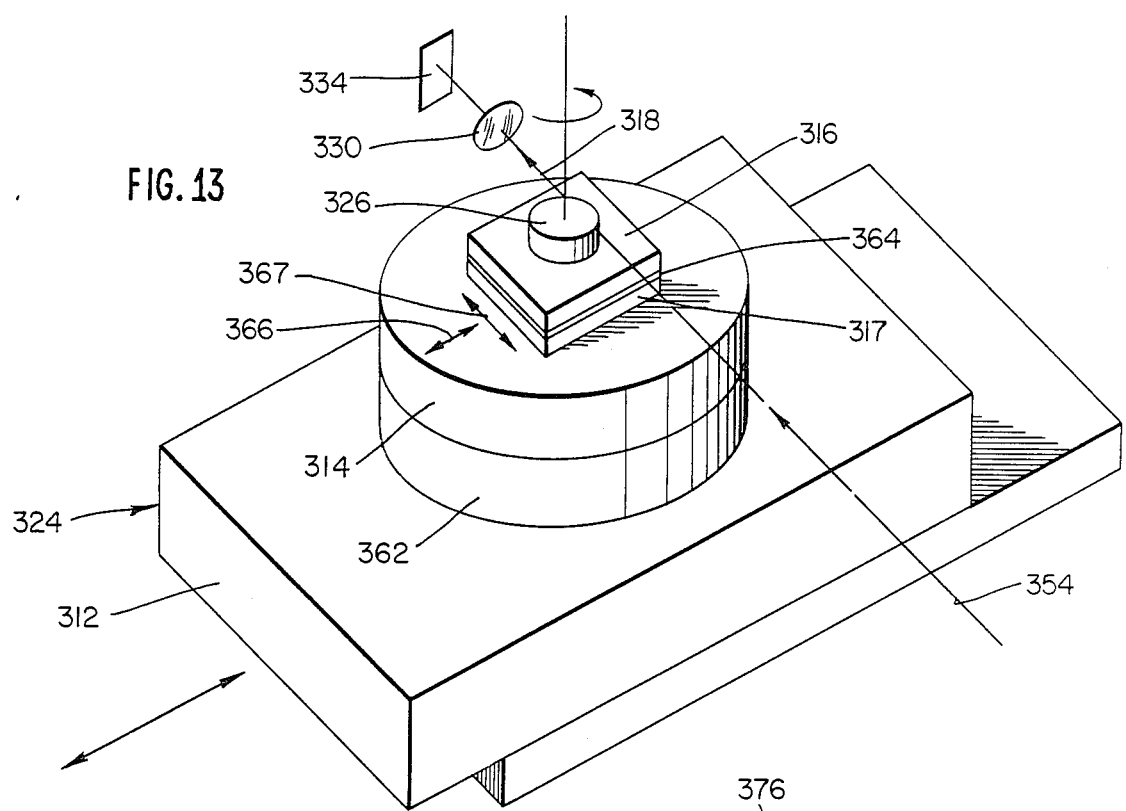
FIG. 13
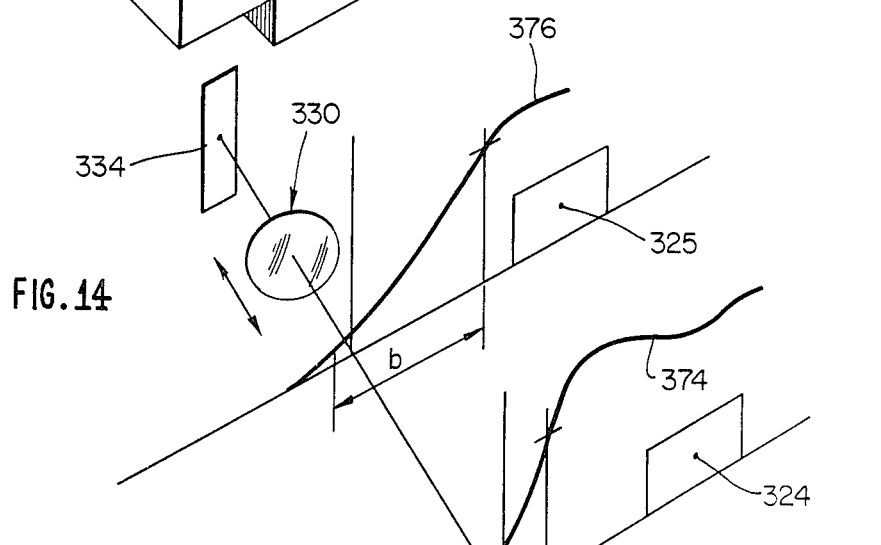
FIG. 14
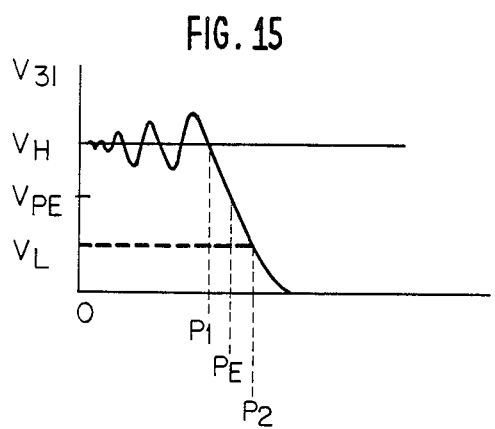
FIG. 15
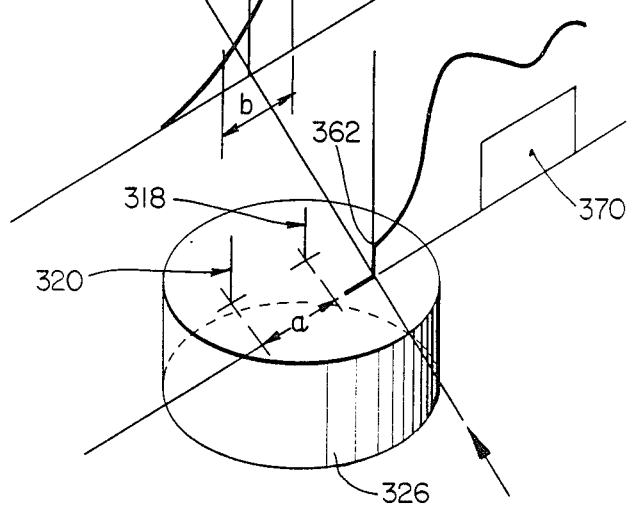

LASER BASED ROUNDNESS AND DIAMETER GAGING SYSTEM AND METHOD OF USING SAME

BACKGROUND OF THE INVENTION

This is a continuation-in-part of application Ser. No. 730,200, filed May 3, 1985, which will issue as U.S. Pat. No. 4,678,337 on July 7, 1987.

The present invention relates to a laser based system for gaging the outside dimension of an object and the roundness of an object, and, more particularly, to a laser based gaging system using imaging and interferometry.

Laser based gaging systems are generally known in the art and are useful in situations where high accuracy is required or where an object to be measured cannot be touched because it is, for example, sensitive, hot, toxic, or the like.

Optical gaging systems are grouped into two major categories. The first category includes systems using imaging or measurement of light reflected from an object to be measured or from a background surface. Such systems include electronic camera based vision systems, beam scanning systems and optical comparators, and profiling systems using front or oblique lighting. The second category includes systems using imaging or measurement of light transmitted past, and not "eclipsed," by the object to be measured. Systems in the second category include gaging microscopes, optical comparators using rear lighting methods, and beam scanning systems using beam interruption methods.

A search of the prior art failed to uncover any prior art reference which discloses the laser based gaging system of the present invention. However, several prior art patents were uncovered which disclose various laser based optical gaging systems.

For example, U.S. Pat. Nos. 3,856,412 and 4,199,259 disclose optical gaging systems wherein a laser beam is scanned by a rotating mirror across a beam splitter, from which one half of the beam is used to calibrate the system and the other half of the beam is eclipsed by a stationary object to be measured. The eclipsed beam is projected onto a photocell which produces a signal from which the diameter of the object is calculated.

U.S. Pat. No. 4,063,103 discloses an electron beam exposure apparatus wherein a pattern is formed on a workpiece disposed on a carriage movable in both X and Y directions. A laser interferometer is used to measure the distance over which the carriage moves.

U.S. Pat. Nos. 3,765,774; 3,905,705; and 4,129,384 disclose optical gaging systems wherein a laser beam is scanned by a rotating mirror across a stationary object. The beam is eclipsed by the object and focused onto a photodetector. The detector signal is then used to calculate the object size.

U.S. Pat. No. 3,743,428 discloses an optical measuring device wherein a laser beam is eclipsed by a stationary test object and then subjected to a grid to divide the beam into a series of pulses which are directed by a rotating scanning mirror onto a slit and photodetector. The size of the test object is calculated by counting the number of pulses that pass through the slit.

The above-described prior art devices have a number of common disadvantages which limit precision. Those devices have a large depth of field that limits their accuracy due to blurring of the detected edge. In addition, they are affected by the varying amount of the light beam that grazes the object. Furthermore, their beam eclipse signatures are as wide as the scanning beam. Such systems also require an accurate angular-to-linear scan conversion lens.

U.S. Pat. Nos. 3,765,774 and 3,905,705 disclose devices the accuracy of which is limited by errors in alignment and angular velocity of the scanning mirrors.

U.S. Pat. Nos. 3,856,412 and 4,199,259 are limited by the accuracy and stability of their calibration scales and gratings.

U.S. Pat. No. 4,129,384 describes a dual beam method for measuring object dimensions. The accuracy of that method depends on factors associated with the beams, which are required to be of equal energy, co-aligned and highly symmetric. Additional disadvantages of the dual beam method are its complexity and high cost.

AXIAM Incorporated produces a Roundness Geometry System (RGS-640) which uses a contact probe to determine the roundness of an object. Steyr also produces a Roundness Tester and Form Analysis Computer FFA-1 which also uses one or more contact probes to determine roundness. A disadvantage of the contact probe devices that determine roundness is that the probe is subject to wear and may deform or even damage the part being measured.

OBJECTS AND SUMMARY OF THE INVENTION

In view of the foregoing limitations and shortcomings of the prior art devices, as well as other disadvantages not specifically mentioned above, it should be apparent that prior to the present invention there existed a need in the art for an improved laser gaging system and method of laser gaging. It is, therefore, a primary object of this invention to fulfill that need by providing a simplified and accurate laser gaging apparatus and method of using the same.

More particularly, it is an object of this invention to provide a laser gaging system that requires a minimum of moving optical parts.

It is another object of this invention to provide a laser gaging system having no moving parts that require critical adjustment.

A further object of the present invention is to provide a method for gaging that is easy to use, yet provides an extremely accurate measurement.

Yet another object of the present invention is to provide a laser gaging system wherein precise placement of the object to be measured is not critical.

It is still another object of the present invention to provide a laser gaging system involving the eclipsing of a laser beam by an object to be measured, wherein reflections of the laser beam from the object do not affect the accuracy of the system.

A further object of the present invention is to provide a laser based interferometric gaging system that is accurate to within a fraction of the wavelength of the laser beam.

It is another object of the present invention to provide a laser gaging system incorporating the above objects that is able to measure either the roundness of a cylindrical part or the outside diameter or both in rapid succession.

Briefly described, these and other objects are accomplished according to the invention by providing a method and system for gaging the outside diameter and/or the roundness of the outside surface of an object using laser interferometry.

In an outside diameter (OD) gaging operation, a test object is placed on a linear translator which is moved across a narrow collimated laser beam. A detector detects the entry of the object into the beam and signals an interferometer to start measuring the distance the translator moves. When the object leaves the beam the detector detects the departure and signals the interferometer to stop measuring the distance moved by the object. From the distance measured, the dimension of the object in the direction of travel is calculated.

A first embodiment of the OD gaging system includes a beam eclipsing subsystem that uses a collimated laser beam that propagates through an imaging system and a narrow slit onto an optical detector. A linear translator carries the object to be gaged across the collimated laser beam so that the projection of the beam onto the detector is eclipsed by the object. A second laser beam is reflected from a reflector on the linear translator and incorporated into an interferometer system that is adapted to measure the displacement of the linear translator. Thresholding electronics connected to the optical detector start and stop a fringe extinction counter connected with the interferometer to count fringes in an interference pattern to accurately determine the distance traveled by the linear translator during the period when the first laser beam is eclipsed. The fringe count is then used to accurately calculate the diameter of the object.

In a roundness gaging operation an object to be measured is placed on a rotational stage which is in turn mounted on a linear translator. The linear translator moves the object into the path of the first laser beam such that the beam is partially eclipsed by the object. As the object is rotated, variations in the eclipsing shadow can be used to determine the roundness of the part.

In addition, the diameter of the object may be measured by providing an interferometer to sense and/or control the translator position.

A second embodiment is an OD/roundness gaging system which includes a beam eclipsing subsystem that uses a collimated beam, an imaging system, a narrow slit and an optical detector (as described in the first embodiment). In addition, a linear motion subsystem is provided which comprises a linear translator, upon which a rotational stage is mounted, an interferometer which senses both the distance and the direction of motion of the linear translator and a position controller which positions the slide at any commanded position.

Another embodiment, primarily designed to measure roundness, is also described herein. It includes an adjustable beam eclipsing subsystem that uses a collimated laser beam which propagates through an adjustable imaging system, a narrow slit and a detector. In addition, a linear translator is provided on which a rotational stage is mounted. A pair of crossed linear translators are mounted on the rotational stage to center the part relative to the stage axis-of-rotation. A roundness measurement is made by moving the part surface so as to partially eclipse the beam. As the part is rotated variations in the eclipse signature level are used to determine the roundness and center position of the part. The imaging system may be adjusted to give varying signature widths and thus accommodate varying degrees of eccentricity and roundness. Centering adjustments can be ascertained by using a wide signature to find the center of the part. The width may then be reduced to provide more accurate roundness measurements.

With the foregoing and other objects, advantages and features of the invention that will become hereinafter apparent, the nature of the invention may be more clearly understood by reference to the detailed description of the invention, the appended claims and to the several views illustrated in the attached drawings.

BRIEF DESCRIPTION OF THE DRAWINGS

FIG. 13 is a perspective view of a device used in the third preferred embodiment of the present invention;

FIG. 14 is a three dimensional graphic representation of light waves propagating from the test object; and FIG. 15 is a graph of the output of the photodetector in the beam eclipsing subsystem of the third preferred embodiment of the present invention.

DETAILED DESCRIPTION

Figure 1:
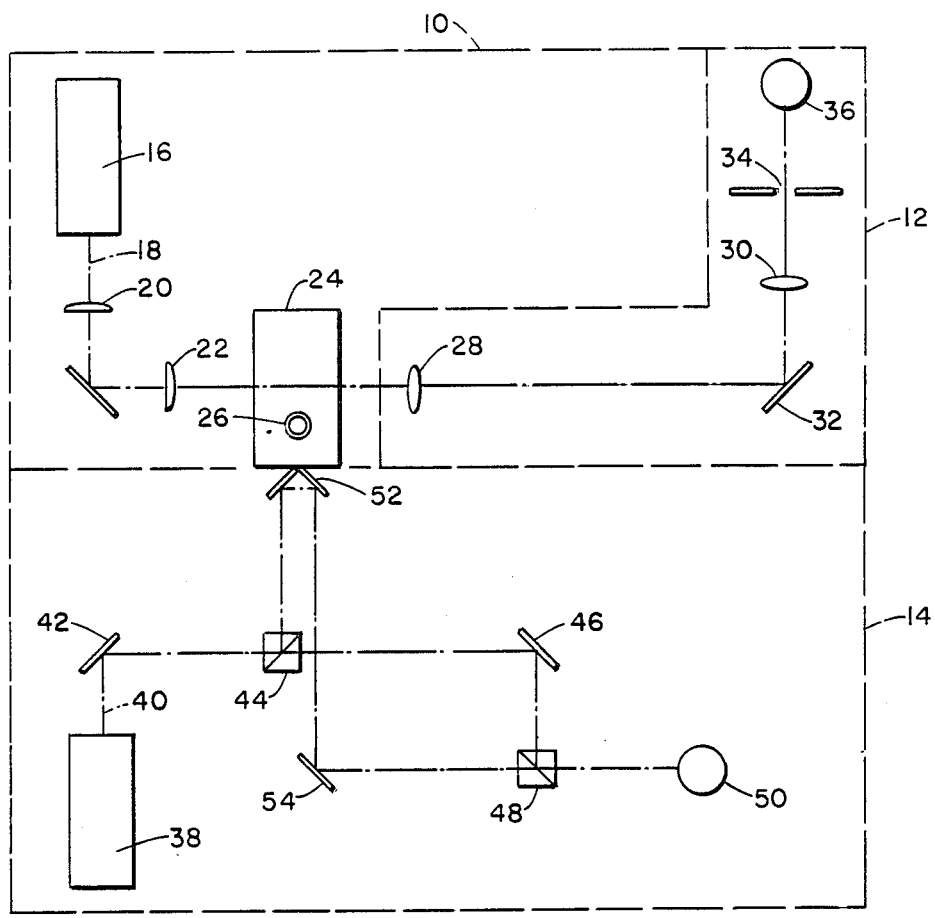
FIG. 1 is a schematic representation of the system according to the present invention.

Referring now in detail to the drawings wherein like parts are designated by like reference numerals throughout, there is illustrated in FIG. 1 a schematic diagram of the laser gaging system according to the present invention.

A beam eclipsing subsystem 10 is shown in schematic relation to an imaging subsystem 12 and an interferometer subsystem 14, each subsystem being depicted in dashed lines.

The beam eclipsing subsystem 10 comprises a laser 16, such as a conventional low power helium-neon device. A laser beam 18 is passed through a series of beam shaping lenses 20, 22 to form a collimated light beam of small cross-section described hereinafter as an Optical Reference Zone (ORZ). The ORZ "cross-section" is the shape (e.g., $e^{-2}$ intensity contour) of the beam in a plane perpendicular to the beam. The length of the cross-section in the direction perpendicular to the translator surface (vertical) is dictated by the accuracy of part fixturing. In practice, it is larger than the vertical uncertainty in part location. Typically, the cross-section extends 0.007 inch vertically and 0.001 inch horizontally near the object.

A linear translator 24 moves back and forth in a direction substantially perpendicular to the direction of propagation of beam 18 and is designed to move an object 26 to be measured across the beam of light 18. As the object 26 is moved into the path of the light beam 18 or ORZ, the beam 18 is eclipsed.

Figure 3:
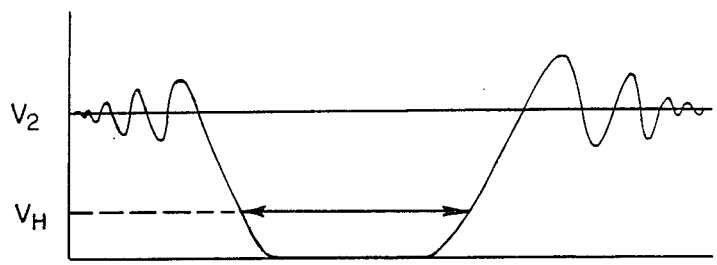
FIG. 3 is a graph of the output of the photodetector in the beam eclipsing subsystem of the present invention.

The imaging system 12 comprises lenses 28, 30 and mirror 32 which direct the propagated beam 18 onto a surface 33 having a narrow vertical slit 34 of about 5 micrometers ($5 \times 10^{-6}$ meters) in width. A photodetector 36 is placed a short distance behind the slit 34 and is designed to emit a voltage signal $V_2$ (see FIG. 3) representative of the intensity of the light beam 18 passing through slit 34.

Thus, when the object 26 is positioned outside the ORZ, the output signal $V_2$ of detector 36 is at a relative maximum, and when the object 26 is in the ORZ, totally eclipsing the beam 18, the output signal $V_2$ of detector 36 is at a relative minimum. Thus, signal $V_2$ can be used to determine when the object 26 is eclipsing the beam 18.

By using signal $V_2$ in conjunction with the interferometer linear measuring system 14 (described hereinbelow) trained on the linear translator 24, the distance that the linear translator 24 moves while the beam 18 is eclipsed can be calculated. That distance is the dimension of the object 26.

Figure 2:
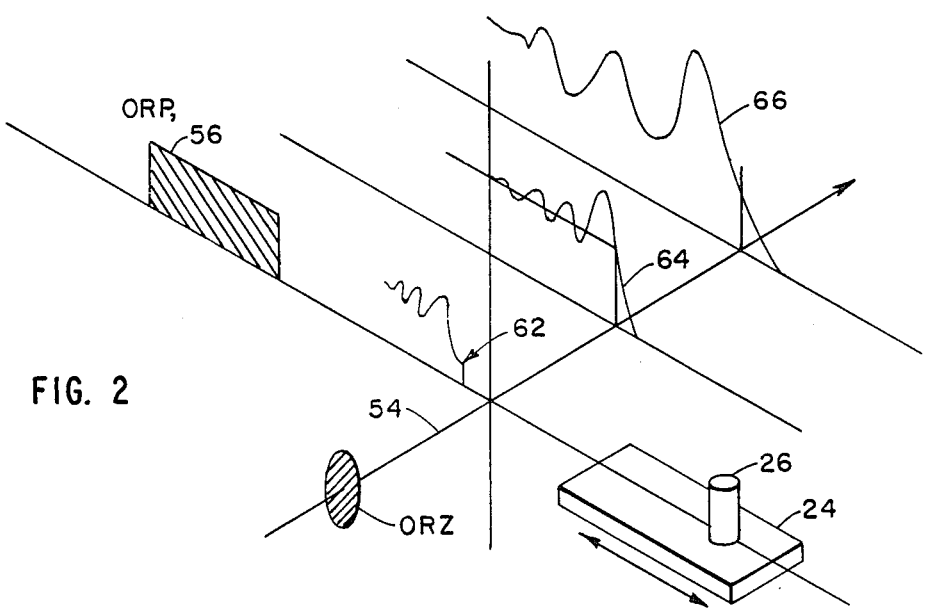
FIG. 2 is a three dimensional graphic representation of light waves propagating from the test object.

Accurate measurement of the object 26 requires that the ORZ eclipse zone, i.e., the ORZ region first entered and last exited by the object, be precisely imaged. As the object 26 to be measured enters the laser beam 18, part of the beam is absorbed or reflected backwards by the object and part of the beam passes by the object uninterrupted. A portion of the beam between the two parts described above, is reflected slightly toward the uninterrupted part of the beam. As the slightly reflected beam crosses the uninterrupted part of the beam, an interference pattern is created. This interference pattern is further complicated by the super-positioning of a diffraction pattern caused by the uninterrupted light tending to bend around the object to be measured. The result of the interference pattern is that there is not a sharp line between the uninterrupted light and the interrupted light, but a gradual transformation, as illustrated in FIG. 2. This interference pattern evolves as the light propagates away from the object.

The image of the eclipse zone is thus a moving light-/dark transition or shadow boundary created by the interception of the beam by the surface of the moving object 26.

Referring to FIG. 2, the plane 56 in the eclipse zone perpendicular to the propagation axis 54, i.e., the axis in the direction of propagation of beam 18, that includes the ORZ point first entered by the object is defined herein as the Object Reference Plane (ORP). In the ORP, the light distribution includes a "step" change 62 in intensity that coincides with a perfect geometric shadow of the object 26. As the light propagates from this plane, the shadow boundary spreads out slightly due to diffraction. See lines 64 and 66 in FIG. 2.

The imaging system 12 produces a diffraction limited, high resolution (200 cycles per millimeter) magnified replica at an image plane (i.e., surface 33) of the light field distribution in the object plane. The referring of the slit to the object plane reduces its effective size by the magnification factor of the imaging system. This allows small regions of the object plane to be sampled. For example, a magnification factor of 15 allows a 5 micrometer ($5 \times 10^{-6}$ meters) slit to sample a 13 microinch wide region. This imaging method produces signatures as narrow as 200 millionths of an inch in width, which allows for highly accurate measurements. The slit length is matched to the vertical uncertainty in object placement.

It has been determined that variations in the light pattern are greater when attempting to image the precise plane in which the object to be measured first enters the light beam (the Object Reference Plane). It is therefore preferable to image the light pattern in a plane adjacent the Object Reference Plane, and not the light pattern in the Object Reference Plane itself. In so doing, more predictable and accurate readings may be obtained. In practice, it has been found that accurate and repeatable measurements of part dimensions are possible by imaging a plane slightly in front of the ORP. Typically, by imaging a plane (object plane) about 0.002 inch in front of the ORP, measurements accurate to $+/-$ five millionths of an inch are possible.

Signal $V_2$ represents the light intensity at the image plane as detected by the photodetector 36 behind the slit 34. By determining a threshold voltage $V_H$ associated with the signature $V_2$ (see FIG. 3), distance measured between threshold points will represent the dimension of the object 26. The level of $V_H$ can be ascertained by calculations or, more easily, by calibrating the device with an object 26 of known size.

One method of calibrating the system is to select $V_H$ such that the distance measured between threshold points represents exactly the object dimension. A second method of calibrating the system is to select $V_H$ such that the distance measured between threshold points deviates from the object dimension by a known amount.

The signal $V_2$ is used in conjunction with the homodyne interferometer system 14 which comprises a laser 38 and an optics system. The laser 38 is a frequency stabilized low power laser, such as a helium-neon device operating in a single longitudinal mode, the output of which comprises a beam 40 which is reflected by a mirror 42 and projected onto a beam splitter 44. Half of the beam 40 is deflected toward the linear translator 24. The other half of the beam 40 passes through the beam splitter 44 and is reflectd by mirror 46 and a second beam splitter 48 and is then projected onto a photodetector 50. The portion of the beam 40 deflected by the beam splitter 44 is retro-reflected from a cube-corner prism reflector 52 mounted on the linear translator 24 onto a mirror 54 from which it is also reflected onto the photodetector 50.

The superpositioning of both halves of beam 40 creates an interference pattern on the detector 50. By means of conventional interferometry, the distance that the linear translator moves can be accurately determined. To reduce noise caused by vibrations from the translator 24, it is important to maintain the translator 24 at a constant velocity while the object 26 is eclipsing the beam 18.

Figure 4:
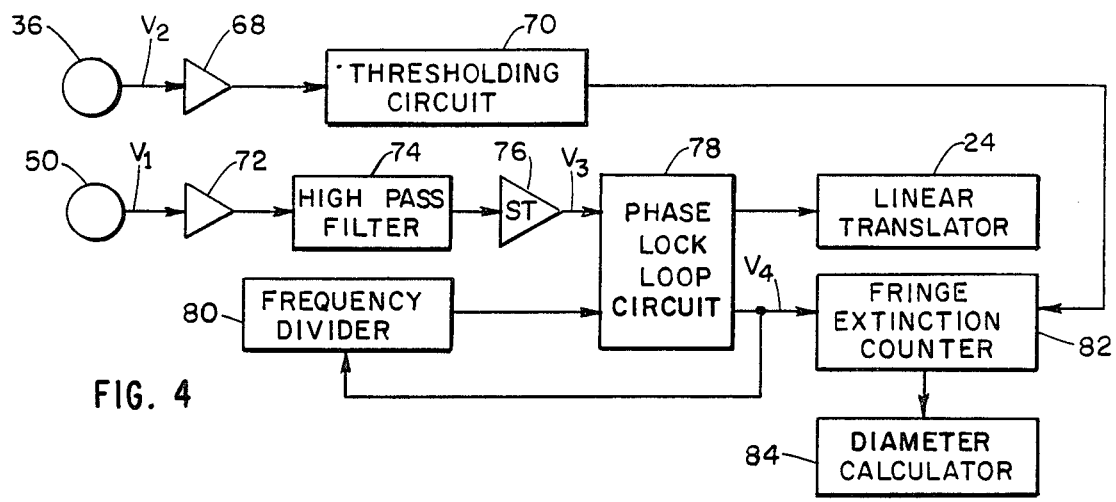
FIG. 4 is a schematic representation of the electronic components of the present invention.

Referring now to FIG. 4, the various components of the electronic circuit will be described operationally. Photodetector 36 produces the signal $V_2$ which is amplified by amplifier 68 and transmitted through a thresholding circuit 70. Such thresholding circuits are well known in the art and are used to determine when the signal $V_2$ drops below $V_H$ as discussed above.

Figure 5:
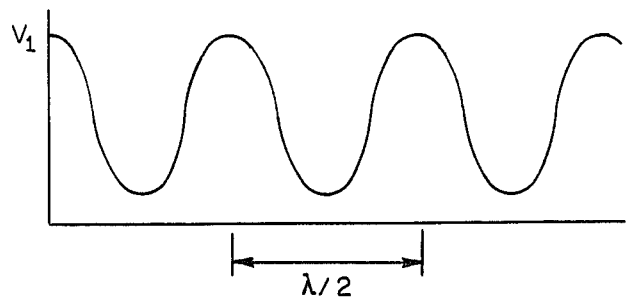
FIG. 5 is a graph of the output of the photodetector of the interferometer of the present invention.
Figure 6:
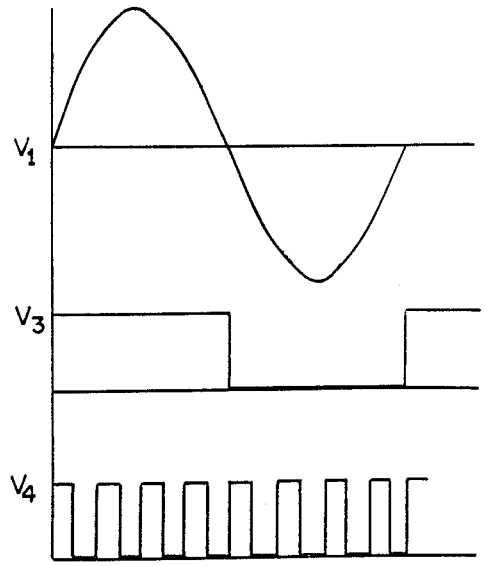
FIG. 6 depicts graphs of the voltage signals at various points in the circuit shown in FIG. 4.

The output from the thresholding circuit 70 is used to control a fringe extinction counter 82 of the interferometer. A signal $V_1$ from photodetector 50 represents the light projected onto the photodetector 50 and is amplified by amplifier 72. See $V_1$ in FIG. 5. The signal $V_1$ is then passed through a high pass filter 74 which eliminates the DC offset. See the top graph in FIG. 6. The signal is then passed through a Schmitt trigger 76 from which a square wave signal $V_3$ emerges, which is also shown in FIG. 6. The square wave signal $V_3$ has a wavelength equal to the wavelength of the input signal $V_1$, which is about 12.5 microinches ($12.5 \times 10^{-6}$ inches). The input signal $V_1$ has a wavelength equal to one half of the wavelength of laser 38 which is known to one part per million and is corrected for temperature and atmospheric pressure.

To increase the resolution capability of the interferometer, the signal $V_3$ is passed through a phase lock loop (PLL) circuit for frequency multiplication. The multiplier circuit includes a PLL circuit 78, such as a conventional XR 215 manufactured by Exar, and a frequency divider 80, such as a standard 74LS93 circuit, in the feedback loop of the PLL circuit. The PLL circuit is also used as a feedback control system to achieve constant velocity motion of the translator 24.

The output $V_4$ of the PLL circuit is a square wave with a frequency multiplied by a factor equal to the frequency division factor of the divider 80. An important feature of this circuit is not only the frequency multiplication characteristic, but also its phase or edge locking nature. That allows each positive transition or edge of $V_4$ to represent one-eighth (in case of multiplication by eight) of the wavelength of the input wave. Thus, each rising edge can be counted by a digital counter and thus represents about 1.56 microinches of travel of the translator 24.

The output $V_4$ of the PLL circuit is then directed to a digital counter 82, such as a 74LS161. The digital counter 82 counts positive transitions of $V_4$ when activated to do so by the thresholding electronics 70. A diameter calculator 84 is then used to convert the fringe count to a figure representing the actual dimension of the object 26.

In operation, a test object 26 is placed on the linear translator 24, which is then moved across the first laser beam in a manner so as to eclipse the beam. The first photo detector 36 detects the initial moment of eclipsing of the beam by the object and signals the interferometer to start measuring the distance moved by the object. When the object leaves the beam, the detector 36 signals the interferometer to stop measuring the distance moved by the object. From the distance actually measured, the dimension of the object in the direction of travel is calculated.

Figure 7:
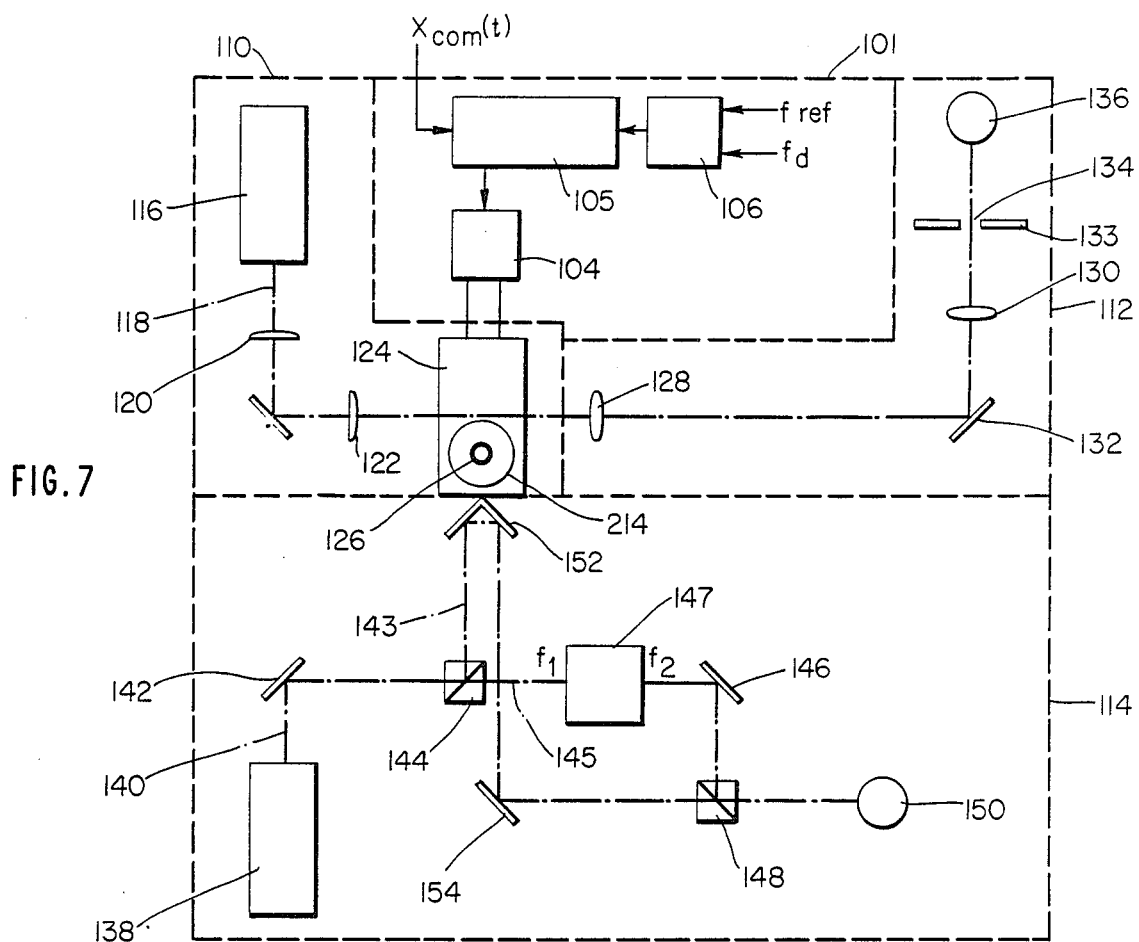
FIG. 7 is a schematic representation of the system according to a second preferred embodiment of the present invention.

With reference to FIG. 7, a second embodiment of the present invention includes a beam eclipsing subsystem 110, shown in schematic relation to an imaging subsystem 112. An heterodyne interferometer subsystem 114, and a motion controller subsystem 101, each subsystem being depicted in dashed lines. These subsystems may be used to determine both the roundness and the diameter of an object 126.

The beam eclipsing subsystem 110 comprises a laser 116, such as a conventional low power helium-neon device. A laser beam 118 is passed through a series of beam shaping lenses 120, 122 to form a collimated light beam of small cross-section described hereinafter as an Optical Reference Zone (ORZ). The ORZ "cross-section" is the shape (e.g., $e^{-2}$ intensity contour) of the beam in a plane perpendicular to the beam. The length of the cross-section in the direction perpendicular to the translator surface (vertical) is dictated by the accuracy of part fixturing. In practice, it is larger than the vertical uncertainty in part location. Typically, the cross section extends 0.001 inch vertically and 0.005 inch horizontally near the object.

A linear translator 124 moves back and forth in a direction substantially perpendicular to the direction of propagation of beam 118 and is designed to move an object 126 to be measured into the beam of light 118. As the object 126 is moved into the path of the light beam 118, the beam 118 is eclipsed.

The imaging subsystem 112 comprises lenses 128, 130 and mirror 132 which direct the propagated beam 118 onto a surface 133 having a narrow vertical slit 134 of about 5 micrometers ($5 \times 10^{-6}$ meters) in width. A photodetector 136 is placed a short distance behind the slit 134 and is designed to emit a voltage signal $V_5$ representative of the intensity of the light beam 118 passing through slit 134.

When the object 126 is positioned outside the ORZ, the output signal $V_5$ of detector 136 is at a relative maximum, and when the object 126 is in the ORZ, thus totally eclipsing the beam 118, the output signal $V_5$ of detector 136 is at a relative minimum. Thus, signal $V_5$ can be used to determine when the object 126 is eclipsing the beam 118.

Figure 10:
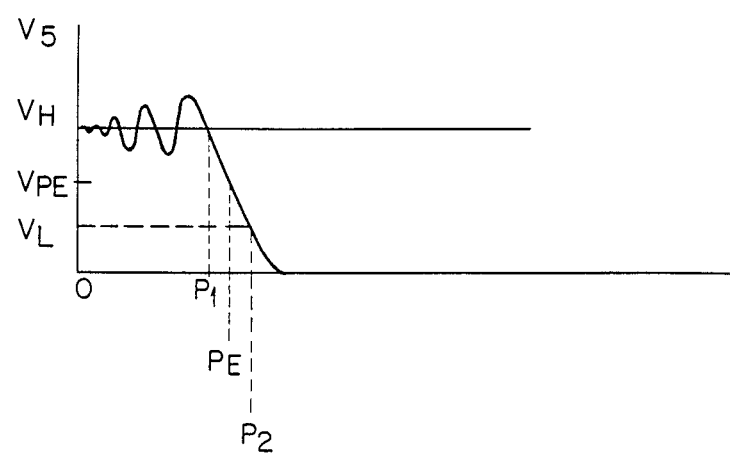
FIG. 10 is a graph of the output of the photodetector in the beam eclipsing subsystem of the second preferred embodiment of the present invention.

If the object 126 was moved from completely out of the beam 118 to a position where it is completely blocking the beam 118, while maintaining the object in a nonrotating mode, the signal $V_5$ would be similar to that illustrated in FIG. 10.

A precision rotational stage 214 is mounted on the linear translator 124 and is controlled by a motion controller subsystem 101. The motion controller subsystem 101 comprises an electronic phase shift accumulator 106, a PID controller 105 and a linear motor 104 which drives the translator.

Referring now to FIG. 7, the heterodyne laser interferometer 114 includes single frequency stabilized laser generator 138 which emits a laser beam 140 having a single frequency $f_1$. The laser beam 140 is reflected by a mirror 142 and passes through a beam splitter 144. A first half (hereinafter the reference beam 145) of the beam 140 passes straight through the beam splitter 144, and a second half (hereinafter the slide beam 143) of the beam 140 is deflected to a cube corner retro-reflector 152 mounted on the linear translator 124.

The reference beam 145 passes from the beam splitter 144 to a frequency shifting device 147. Such frequency shifting devices are known to those skilled in the art, and may comprise a pair of acousto-optical modulators, such as the AOM-40 sold by Intra Action Corp. The frequency of the reference beam 145 is preferably shifted about one megahertz (MHz) from the frequency of the slide beam 143 to a frequency $f_2$. In actual operation, the frequency of the reference beam 145 is shifted up about 40 MHz and then down about 39 MHz for a net 1 MHz shift.

Double shifting is performed to achieve a net shift of one MHz due to the fact that acousto-optical modulators operating at about 40 MHz are much more efficient, less costly, and easier to design and install than units operating at one MHz.

Alternatively, instead of using a single frequency stabilized laser generator 138 and a frequency shifting device 147 a laser emitting a beam consisting of two orthogonally polarized waves of different frequency may be used. In such a case, the waves are separated using polarization sensitive optics (e.g., quarter/half wave plates, polarizing beam splitters, Brewster angle optics etc.). One of the waves serves as the reference beam, the other as the slide beam.

In the embodiment using the single frequency stabilized laser generator 138 and the frequency shifting device 147, the frequency shifted reference beam 145 and the slide beam 143 are guided by respective mirrors 146,154 onto a second beam splitter 148 and then mixed onto an optical detector 150, such as an SD-041 series made by Silicon Detector Corp.

The optical detector 150 detects the difference in the frequencies of the frequency shifted reference beam 145 and the slide beam 143. When the linear translator 124 and reflector 152 are stationary, the frequency shift imparted by the frequency shifting device 147 will be detected. When the linear translator 124 and reflector 152 are moving, the slide beam 143 will be phase advanced (or retarded) such that for every half wavelength of linear translator motion, the phase of the slide beam 143 will undergo either one additional cycle or one less cycle, depending on the direction of the linear slide 124 motion.

To detect the phase shifts caused by movement of the linear slide 124, an electrical reference frequency $f_{ref}$ is defined as the difference in frequency ($f_d$) between the slide beam 143 and the frequency shifted reference beam 145 when the slide 124 is stationary. During operation of the linear translator 124, $f_d$ varies with movement of the linear translator 124.

In a given time interval of operation, the difference between $f_d$ and $f_{ref}$ is recorded by a phase shift accumulator 106. This difference represents the change in the position of the linear slide 124 during this time interval. Positive differences represent movement of the linear slide 124 toward the beam splitter 144, while negative differences represent movement of the linear slide 124 away from the beam splitter 144.

Figure 8:
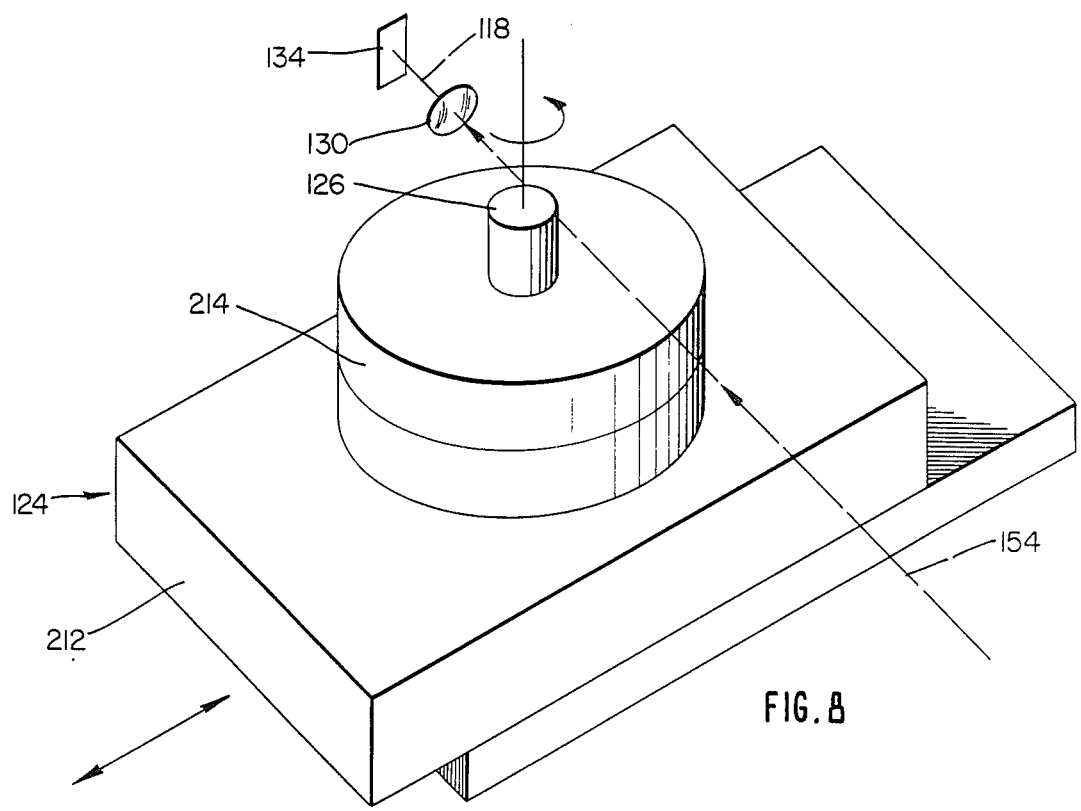
FIG. 8 is a perspective view of a device used in the second preferred embodiment of the present invention.

With reference now to FIGS. 7 and 8, the linear slide 124 comprises a precision ball slide 212, which is driven in a straight line along a track by the linear motor 104. The linear motor 104 and thus the linear slide 124 are controlled by the P.I.D. (Proportional Integral Differential) controller 105.

The PID controller is a feedback system capable of controlling the movements of mechanical elements through the use of an actuator such as the linear motor 104 and position sensors such as the heterodyne interferometer discussed above. The P.I.D. controller 105 receives command signals $x_{com}(t)$ from a computer operating system and from the electronic phase shift accumulator 106 which receives the signals $f_{ref}$ and $f_d$ from the optical detector 150. The accumulator's 106 output corresponds to the position of the slide 124 relative to a starting point. The starting point is the position of the slide 124 when the accumulator is activated prior to operation of the interferometer.

With reference to FIG. 8, the precision ball slide 212 translates linearly in a direction perpendicular to the direction of propagation 154 of the beam 118. A rotational bearing 214 is mounted on the precision ball slide 212 for rotation in a horizontal plane above the precision ball slide 212.

To determine the roundness of the object 126, the object 126 is placed on the rotational stage 214. The object 126 is fixtured so that the central axis of the part is located within a few thousandths of an inch from the axis of rotation of the stage 214.

Figure 11:
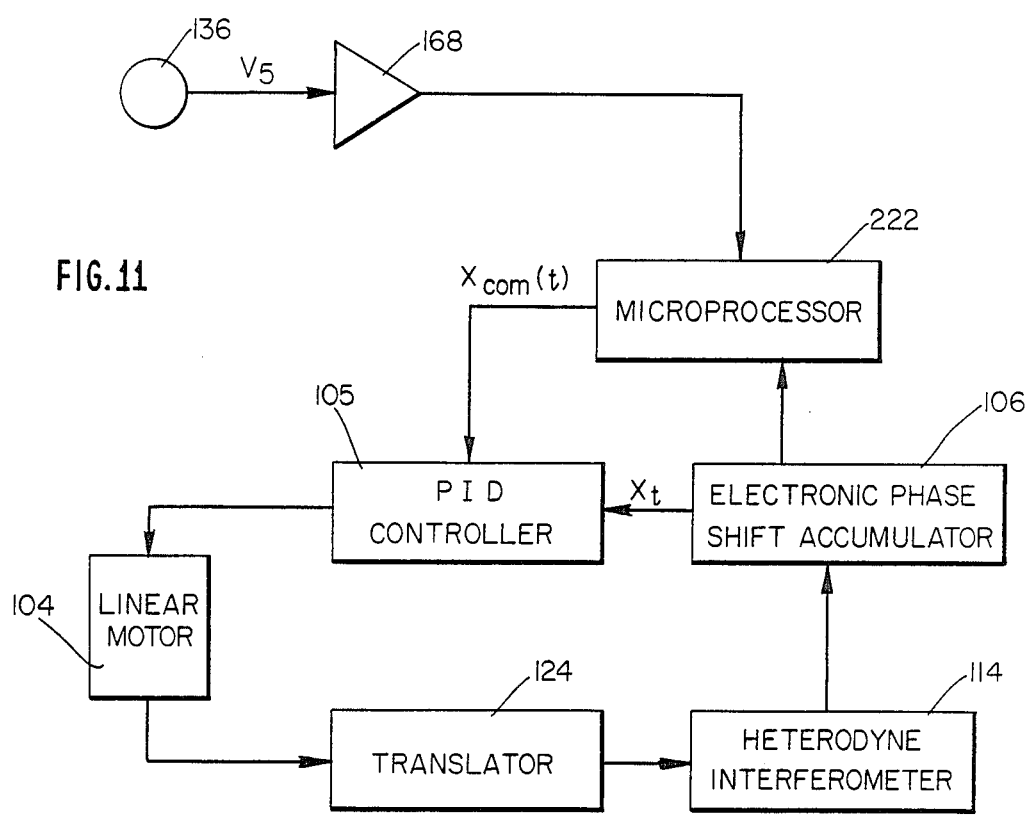
FIG. 11 is a schematic representation of the electronic components of the second preferred embodiment of the present invention.

After the object 126 has been adequately positioned, the linear translator 124 is positioned such that the object 126 is partially eclipsing the beam 118. With reference to FIG. 11, a microprocessor 222, such as a IBM PC, is used to control the positioning of the linear translator 124. The signal $V_5$, emitted from the photodetector 136, is inputted to the microprocessor 222. A level $V_{PE}$ for signal $V_5$ is chosen between the relative minimum and maximum values of $V_5$ to indicate when the beam 118 is partially eclipsed by the object 126.

Once the object 126 is positioned such that the signal $V_5$ is at $V_{PE}$, the rotational bearing 214 is rotated so as to move, i.e., rotate, the object 126 within the beam 118. As the object 126 rotates, any eccentricity between the central axis 218 of the object 126 and the axis 220 of rotation of the bearing will cause the amount of light passing by the object 126 to vary. Also, any lack of roundness in the object 126 will cause further variations in the light passing the object 126 as the object rotates.

Because of the reflection and diffraction effects of the light passing the object, the variation in light passing the object 126 is not necessarily directly proportional to the amount of eccentricity or lack of roundness of the object 126. This is particularly true at regions between O and $P_1$ and greater than $P_2$ (see FIG. 10). Thus, the signal level $V_{PE}$ is chosen so that the object is between positions $P_1$ and $P_2$.

Figure 9:
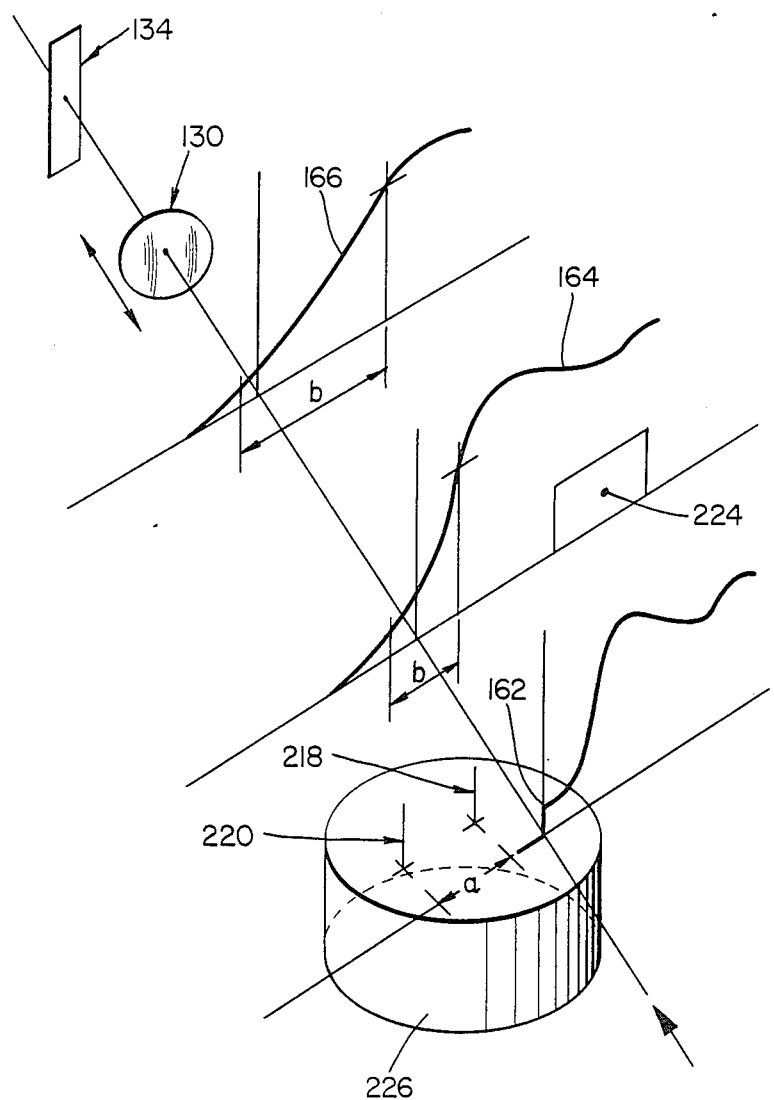
FIG. 9 is a three dimensional graphic representation of light wave propagating from the test object.

If the entire beam of light passing the object 126 was directed onto the photodetector 136, the detailed "signature" shown in FIG. 10 would not be determined because the photodetector 136 emits a signal representative of the total light impinging on it. Instead, the signal would change from a maximum value to a minimum value as the object 126 moved into the beam without the oscillatory effects shown in FIG. 10. However, this signal would not be able to distinguish the actual pattern of the light beam striking the photodectctor which includes the variations caused by reflections and diffraction of the beam as it passes by the object (see FIG. 9). It is only by sampling the light beam with the small slit 134 that the photodetector is able to emit a signal representative of the actual light pattern. For this reason, it is preferable that the slit 134 be smaller than the width of the signature pattern of the beam.

While the object 126 is being rotated, the microprocessor 222 senses variations in the signal $V_5$ caused by any lack of roundness or eccentricity between the object 126 and the rotational bearing 24. In response to the variations, the microprocessor 222 moves the linear translator 124 back and forth so as to keep the signal $V_5$ constant at $V_{PE}$.

Accordingly, the motion of the linear translator 124 during rotation of the object 126 corresponds directly with any lack of roundness of the object 126 and/or any eccentricity between the axis 218 of the object 126 and the axis 220 of the rotational bearing 214. Thus, the lack of roundness and/or the eccentricity can be determined by monitoring the motion of the linear translator 124.

The rotational stage 214 is rotated by a full 360 degrees. The motion of the linear translator vs. angle data is collected by the microprocessor 222 during this rotation is then analyzed by the microprocessor 222 to determine the lack of roundness and eccentricity according to any of the well known criteria for out-of-roundness known in the art such as the Minimum Radial Separation (MRS) criteria, the Least Squares Center (LSC) criteria, the Maximum Inscribed Circle (MIC) criteria or the Minimum Circumscribed Circle (MCC) criteria found in American National Standard, Measurement of Out-Of-Roundness, ANSI B89.3.1-1972 published by The American Society of Mechanical Engineers, New York.

In addition, the outside diameter can be determined by various methods. In one method, one edge of the object is positioned in the beam such that a predetermined signal $V_5$ level is obtained. The part is moved under microprocessor 222 control until the opposite edge is located in the beam and the same signal level is obtained. The dimension of the part is calculated from the distance the object moved and from the relationship between the object edge and the signal level. The relationship between the signal and the part edge may be determined by theoretical calculation of the signature shape or by calibration with parts of known dimension. By adding the distance moved and the signature offset relative to each part edge the part diameter is obtained.

Figure 12:
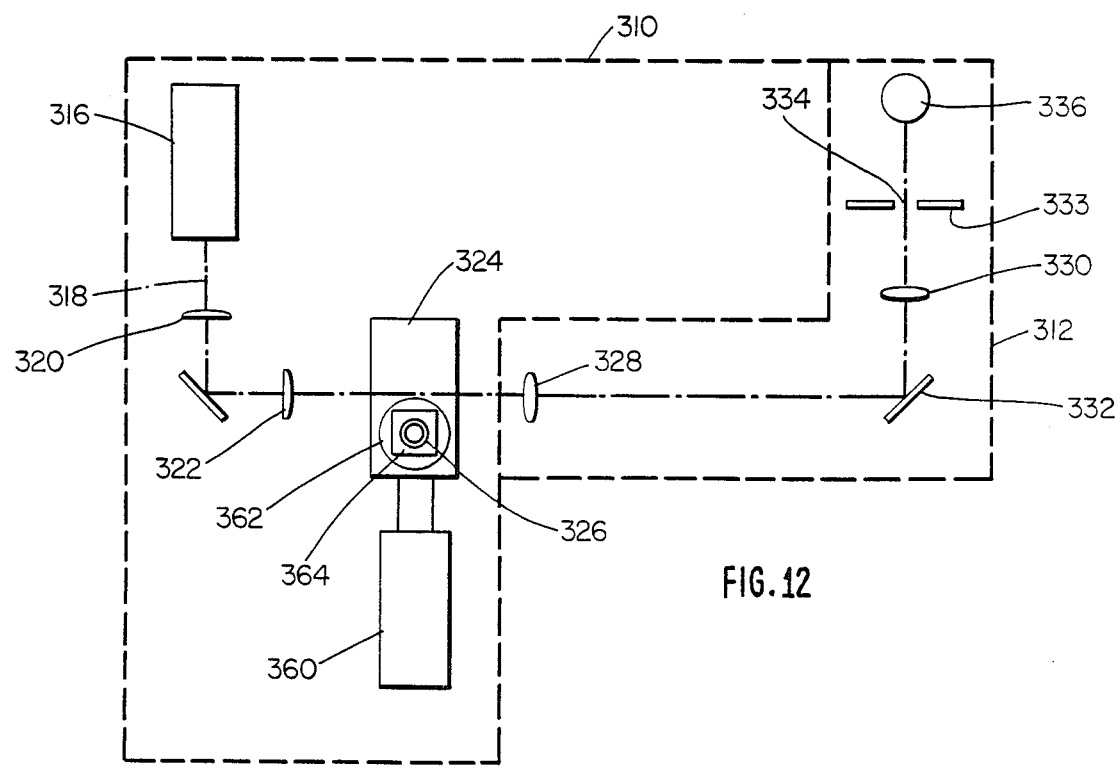
FIG. 12 is a schematic representation of the system according to a third preferred embodiment of the present invention.

With reference to FIG. 12, a third preferred embodiment of the present invention includes a beam eclipsing subsystem 310 shown in schematic relation to an imaging subsystem 312, a rotational subsystem 362 and a centration subsystem 364, the beam eclipsing subsystem 310 and imaging subsystem 312 being depicted in dashed lines. These subsystems are used to determine the roundness of an object 326.

The beam eclipsing subsystem 310 comprises a laser 316, such as a conventional low power helium-neon device. A laser beam 318 is passed through a series of beam shaping lenses 320, 322 to form a collimated light beam of small cross section described hereinafter as an Optical Reference Zone (ORZ). The ORZ "cross section" is the shape (e.g., $e^{-2}$ intensity contour) of the beam in a plane perpendicular to the beam. The length of the cross-section in the direction perpendicular to the translator surface (vertical) is dictated by the accuracy of part fixturing. In practice, it is larger than the vertical uncertainty in part location. Typically, the cross section extends 0.001 inch vertically and 0.005 inch horizontally near the object.

A linear translator 324 moves back and forth in a direction substantially perpendicular to the direction of propagation of the beam 318 and is designed to move an object 326 to be measured into the beam of light 318 under control of a motor 360. As the object 326 is moved into the path of the light beam 318, the beam 318 is eclipsed.

The imaging subsystem 312 comprises lenses 328, 330 and mirror 332 which direct the propagated beam 318 onto a surface 333 having narrow vertical slit 334 of about 5 micrometers ($5 \times 10^{-6}$ meters) in width. A photodetector 336 is placed a short distance behind the slit 334 and is designed to emit a voltage signal $V_{31}$ representative of the intensity of the light beam 318 passing through slit 334.

When the object 326 is positioned outside the ORZ, the output signal $V_{31}$ of detector 336 is at a relative maximum, and when the object 126 is in the ORZ, thus totally eclipsing the beam 318, the output signal $V_{31}$ of detector 336 is at a relative minimum. Thus, signal $V_{31}$ can be used to determine when the object 126 is eclipsing the beam 318.

If the object 326 was moved from completely out of the beam 318 to a position where it is completely blooking the beam 318, while maintaining the object in a nonrotating mode, the signal $V_{31}$ would be similar to that illustrated in FIG. 15.

With reference to FIG. 13, the linear translator 324 includes a precision ball slide 312 for linear translation in a direction perpendicular to the direction of propagation 354 of the beam 318. The rotational subsystem 362 is mounted on the precision ball slide 312 and includes a precision rotational air bearing 314 for rotation about the vertical axis in a horizontal plane above the precision ball slide 312.

The centration subsystem 364 is mounted on the rotational bearing 314 and includes a pair of crossed piezoelectric positioning devices 316 and 317 for fine positioning in the horizontal plane in the orthogonal directions 366 and 367. The object 326 to be measured is placed or mounted on the centration subsystem 364 such that the central axis 318 of the object 326 approximately coincides with the center of rotation of the rotational bearing 314.

With reference to FIG. 12 and FIG. 14, the positions of imaging lenses 328 and 330 are automatically adjustable so that the object plane corresponding to the image plane 333 is a variable plane adjacent the plane in the beam 318 that is first entered by the object 326, i.e., the object reference plane (ORP) 370. The adjustability enables the imaging system 312 to image a plane 324 slightly in front of the ORP 370. Such a plane 324 results in a relatively narrow shadow signature width "b" in the shadow signature 374. The adjustability also enables the imaging system to image a plane 325 relatively far in front of the ORP 370. Such a plane 325 results in a relatively wide shadow signature width "b" in shadow signature 376.

To determine the roundness of the object 326, the object 326 is first placed on the centrator subsystem 364. It is not critical that the central axis 318 of the object 326 align precisely with the center of rotation of the rotational bearing 314.

The imaging lenses 328 and 330 ar then positioned so as to image an object plane relatively far in front of the ORP 370, such as plane 325. The signature width "b" of shadow signature is thus relatively wide.

The linear translator 324 is then positioned such that the object 326 is partially eclipsing the beam 318. A level $V_{PE}$ is chosen nominally halfway between the relative minimum and maximum values of $V_{31}$ to indicate when the beam 318 is partially eclipsed by the object 326.

Once the object 326 is positioned such that the signal $V_{31}$ is at $V_{PE}$, the rotational bearing 314 is rotated so as to rotate the object 326 within the beam 318. As the object 326 rotates, any eccentricity between the central axis 318 of the object 326 and the axis 320 of rotation of the bearing will cause the amount of light passing by the object 326 to vary. Also, any lack of roundness in the object 326 will cause further variations in the light passing the object 326 as the object rotates.

Because of the reflection and diffraction effects of the light passing the object, the variation in light passing the object 326 is not necessary directly proportional to the amount of eccentricity or lack of roundness of the object 326. This is particularly true at regions between O and $P_1$ and greater than $P_2$ (see FIG. 15). Thus, the signal level $V_{PE}$ is chosen so that the object is between positions $P_1$ and $P_2$.

If the entire beam of light passing the object 326 was directed onto the photodetector 336, the detailed "signature" shown in FIG. 15 would not be determined.

Instead, the signal would change from a maximum value to a minimum value as the object 326 moved into the beam without the narrow shadow signature width "b" or oscillatory effects shown in FIG. 15. However, this signal would not be able to distinguish the actual pattern of the light beam which includes the variations caused by reflections and diffraction of the beam as it passes by the object (see FIG. 13). It is only by sampling the light beam with the small slit 334 that the photodetector is able to emit a signal representative of the actual light pattern. For this reason, it is preferable that the slit 334 be smaller than the width of the signature pattern of the beam.

While the object 326 is being rotated, the linear translator 324 is locked in place. Variations in the signal $V_{31}$ output from the photodetector 336 are converted via the nonlinear relationship shown in FIG. 15 to represent variations in the object edge location relative to the beam. These edge location variations are due to any lack of roundness of the object 326 and/or eccentricity between the object center axis 318 and rotational axis 320. Thus the lack of roundness and/or eccentricity can be determined by monitoring the signal $V_{31}$ output from photodetector 336.

The rotational subsystem 362 is rotated by a full 360 degrees while the linear translator 324 is locked. The edge location variations vs. angle of rotation data collected during this rotation are then analyzed according to any of the well known criteria for out-of-roundness known in the art such as the Minimum Radial Separation (MRS) criteria, the Least Squares Center (LSC) criteria, the Maximum Inscribed Circle (MIC) criteria or the Minimum Circumscribed Circle (MCC) criteria found in American National Standard, Measurement of Out-Of-Roundness, ANSI B89.3.1-1972 published by the American Society of Mechanical Engineers, New York.

The displacement vs. angle data analyzed according to any of these criteria will yield the horizontal coordinates of the center axis 318 of the object 326 relative to a datum located at the rotational bearing axis 320.

At this point a low resolution roundness measurement is complete. Note that the centration subsystem is not necessary to achieve the low resolution roundness measurement. The object can be mounted directly on the rotational subsystem 362 in this case.

If necessary, to achieve a high resolution roundness measurement, the centrator subsystem 364 can then be activated so as to bring the center axis 318 of the object 326 and the rotational bearing axis 320 into more perfect alignment. The imaging lenses 328 and 330 are then positioned so as to image an object plane relatively near the ORP such as plane 324. The signature width "b" of the shadow signature is thus relatively narrow. The above process is then repeated beginning with moving the linear translator 324 so that the beam 318 is partially eclipsed by the object 326. Note that the narrower signature will afford a higher resolution roundness measurement now that the object 326 center axis 318 is more coincident with the rotational bearing axis 320.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A method of measuring comprising the steps of:
   providing a laser beam;
   translating an object to be measured into the beam;
   imaging onto a first plane a light pattern formed in a second plane, said light pattern including a diffraction pattern caused by interaction of the beam and the object, said second plane being adjacent the plane perpendicular to the beam that is first entered by the object;
   moving the object within the beam while the intensity of the light pattern is below a threshold value;
   sampling the intensity of the light pattern in the first plane over a fraction of its extent, said fraction being sufficiently small to enable resolution of the diffraction pattern; and
   calculating a dimension of the object from the sampled light pattern.

2. The method of claim 1, wherein the dimension is the roundness of the object.

3. The method of claim 1, wherein moving the object within the beam comprises rotating the object within the beam.

4. The method of claim 1, wherein the object is translated into the beam so as to partially eclipse the beam.

5. The method of claim 3, further comprising the steps of:
   adjusting the location of the object in response to changes in the sampled intensity of the beam;
   measuring the changes in the location of the object; and
   calculating the dimension of the object from the measured changes.

6. A device for measuring an object, comprising:
   a laser beam;
   means for moving the object with respect to the beam;
   an object reference plane being the plane perpendicular to the beam that is first entered by the object;
   means for imaging a light pattern formed in a second plane onto a first plane, said second plane being adjacent the object reference plane, and said light pattern including a diffraction pattern caused by interaction of the beam and the object;
   limiting means interposed at the first plane for limiting the extent of the beam that passes through the first plane;
   a photodetector that emits a signal representative of the light received arranged behind said limiting means for detecting the portion of the beam that passes through the limiting means;
   said limiting means being sufficiently small so as to enable resolution of the diffraction pattern by the photodetector; and
   means for calculating a dimension of the object in response to the signal emitted by the photodetector.

7. The device according to claim 6, wherein the means for moving the object includes means for rotating the object.

8. The method of claim 1, wherein the steps of translating the object to be measured into the beam and moving the object within the beam while the intensity of the light pattern is below a threshold value include the steps of:
   moving the object into the beam such that the beam is partially eclipsed by the object;
   rotating the object while the object is partially eclipsing the beam; and moving the object in a direction perpendicular to the beam in order to keep the sampled intensity of the light pattern at a substantially constant value while rotating the object.

9. The method of claim 8, wherein the step of calculating a dimension includes measuring the distance that the object moved in a direction perpendicular to the beam.

10. The method of claim 1, wherein the steps of translating an object into the beam, moving the object within the beam, and calculating a dimension of the object include:

moving the object into the beam such that the beam is partially eclipsed by the object;
rotating the object while the object is partially eclipsing the beam; and
measuring variations in the intensity of the light pattern to determine the roundness of the object.

11. The device according to claim 6, wherein the means for moving the object includes means for moving the object in a direction perpendicular to the beam.

12. The device according to claim 11, wherein the means for moving the object includes means for rotating the object.

13. The device according to claim 6, wherein the limiting means is a surface having a vertical slit therein.

* * * * *